United States Patent
Lucas et al.

(10) Patent No.: US 9,490,461 B2
(45) Date of Patent: *Nov. 8, 2016

(54) STORAGE SYSTEM FOR PASSENGER VEHICLE

(71) Applicant: Ford Global Technologies, LLC, Dearborn, MI (US)

(72) Inventors: Marc Jonathon Lucas, Novi, MI (US); John Stephen Wuerth, Novi, MI (US); Peter Daniel Houk, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/302,018

(22) Filed: Jun. 11, 2014

(65) Prior Publication Data

US 2014/0356679 A1 Dec. 4, 2014

Related U.S. Application Data

(62) Division of application No. 13/172,678, filed on Jun. 29, 2011, now Pat. No. 8,763,871.

(51) Int. Cl.
*H01M 2/10* (2006.01)
*B60L 11/18* (2006.01)
(Continued)

(52) U.S. Cl.
CPC ........ *H01M 2/1083* (2013.01); *B60L 11/1864* (2013.01); *B60L 11/1877* (2013.01); *B60N 2/305* (2013.01); *B60N 2/3013* (2013.01);
(Continued)

(58) Field of Classification Search
CPC ......... H01M 2/10; B60N 2/305; B60N 2/36; B60R 5/045
See application file for complete search history.

(56) References Cited

U.S. PATENT DOCUMENTS 3,873,010 A 3/1975 Patterson
4,832,242 A 5/1989 Leek
(Continued)

FOREIGN PATENT DOCUMENTS

CN 1493475 A 5/2004
CN 2803113 Y 8/2006
(Continued)

OTHER PUBLICATIONS

Chinese Patent Office, Office Action dated Jul. 8, 2015 for CN201210211347.1.

*Primary Examiner* — Brian D Nash
(74) *Attorney, Agent, or Firm* — David B. Kelley; Brooks Kushman P.C.

(57) ABSTRACT

A passenger vehicle is provided with a seating row that is oriented in a passenger compartment forward of a storage compartment. The seating row has a seat back that is pivotally connected to the vehicle body for providing access to the storage compartment when the seat back is in a collapsed position. A battery having a top surface is mounted within the storage compartment. A receptacle is provided with a back surface that is connected to the top surface of the battery by a panel. The receptacle moves in a fore-and-aft direction relative to the battery between a rearward position within the storage compartment and a forward position within the passenger compartment. A face of the receptacle engages the seat back, and the panel extends from the receptacle to the battery in the forward position for providing a raised platform extending to the passenger compartment.

18 Claims, 4 Drawing Sheets

(51) Int. Cl.
  *B60R 5/04* (2006.01)
  *B60N 2/30* (2006.01)
  *B60N 2/36* (2006.01)
  *B60K 1/04* (2006.01)

(52) U.S. Cl.
  CPC . *B60N2/36* (2013.01); *B60R 5/04* (2013.01); *B60R 5/045* (2013.01); *B60K 1/04* (2013.01); *B60L 2220/42* (2013.01); *Y02T 10/648* (2013.01); *Y02T 10/7005* (2013.01); *Y02T 10/7061* (2013.01)

(56) References Cited

U.S. PATENT DOCUMENTS

| | | | |
|---|---|---|---|
| 4,911,296 A | 3/1990 | Hart | |
| 5,011,208 A | 4/1991 | Lewallen | |
| 5,299,722 A | 4/1994 | Cheney | |
| 5,632,520 A | 5/1997 | Butz | |
| 6,155,621 A | 12/2000 | Nishida et al. | |
| 6,176,535 B1 | 1/2001 | Chaloult et al. | |
| 6,220,383 B1* | 4/2001 | Muraki | B60K 1/04 180/68.5 |
| 6,290,277 B1 | 9/2001 | Spykerman et al. | |
| 6,461,090 B1 | 10/2002 | Faber et al. | |
| 6,541,151 B2* | 4/2003 | Minamiura | H01M 10/625 180/68.5 |
| 6,626,477 B2 | 9/2003 | Maynard et al. | |
| 6,672,641 B2 | 1/2004 | Hodge | |
| 6,702,355 B1 | 3/2004 | Price | |
| 6,874,667 B2 | 4/2005 | Dykstra et al. | |
| 6,905,155 B1 | 6/2005 | Presley et al. | |
| 7,004,274 B2 | 2/2006 | Shibasawa et al. | |
| 7,360,817 B2 | 4/2008 | Schwalie et al. | |
| 7,481,477 B2 | 1/2009 | Yang | |
| 7,690,686 B2 | 4/2010 | Hashimura et al. | |
| 7,748,775 B2 | 7/2010 | Mercurio | |
| 7,766,422 B2 | 8/2010 | Edwards et al. | |
| 7,789,454 B2 | 9/2010 | Kim et al. | |
| 8,186,736 B2 | 5/2012 | Jouraku | |
| 8,353,550 B1 | 1/2013 | Lucas | |
| 8,413,947 B2 | 4/2013 | Chiang | |
| 8,528,957 B2* | 9/2013 | Ugalde | B60R 5/04 280/782 |
| 8,567,543 B2* | 10/2013 | Kubota | B60K 1/04 180/65.21 |
| 8,708,079 B2* | 4/2014 | Hashimura | B62D 25/2027 180/311 |
| 8,876,184 B2* | 11/2014 | Lucas | B60R 7/043 296/24.44 |
| 2002/0078943 A1 | 6/2002 | Montgomery | |
| 2002/0079315 A1 | 6/2002 | Yang | |
| 2002/0157886 A1* | 10/2002 | Iwase | B60K 1/04 180/68.5 |
| 2003/0089540 A1* | 5/2003 | Koike | H01M 2/1055 180/68.5 |
| 2006/0181103 A1 | 8/2006 | Khan et al. | |
| 2007/0157254 A1 | 7/2007 | Huang | |
| 2007/0246495 A1 | 10/2007 | Hague | |
| 2009/0071991 A1 | 3/2009 | Evans | |
| 2009/0104511 A1 | 4/2009 | Maguire et al. | |
| 2010/0090502 A1 | 4/2010 | Mercurio | |
| 2010/0156130 A1 | 6/2010 | Langer et al. | |
| 2010/0170736 A1 | 7/2010 | Watanabe et al. | |
| 2013/0001972 A1 | 1/2013 | Ugalde et al. | |

FOREIGN PATENT DOCUMENTS

| | | |
|---|---|---|
| CN | 101263020 A | 9/2008 |
| DE | 202007016318 U1 | 3/2008 |
| EP | 1800940 A2 | 6/2007 |
| JP | 5008677 A | 1/1993 |
| JP | 11048870 A | 2/1999 |
| JP | 2002160564 A | 6/2002 |
| JP | 2005199878 A | 7/2005 |
| JP | 2010116029 A | 5/2010 |
| WO | 2010051646 A1 | 5/2010 |

* cited by examiner

STORAGE SYSTEM FOR PASSENGER VEHICLE

CROSS-REFERENCE TO RELATED APPLICATION

This application is a division of U.S. application Ser. No. 13/172,678, filed on Jun. 29, 2011, now U.S. Pat. No. 8,763,871, issued Jul. 1, 2014, which is hereby incorporated in its entirety by reference herein.

TECHNICAL FIELD

The invention relates to a storage system and a receptacle assembly for storing articles within a passenger vehicle.

BACKGROUND

Electric and hybrid-electric vehicles typically include a high-voltage ("HV") battery that is larger than conventional vehicle batteries. Such HV batteries are typically too large to be packaged in the engine compartment, and therefore are often packaged elsewhere in the vehicle.

SUMMARY

In at least one embodiment of the invention, a passenger vehicle is provided with a vehicle body having a passenger compartment and a storage compartment oriented rearward of the passenger compartment. A seating row is oriented in the passenger compartment forward of the storage compartment. The seating row has a seat back that is pivotally connected to the vehicle body for providing access to the storage compartment when the seat back is in a collapsed position. A battery having a top surface is mounted within the storage compartment. A receptacle is provided with a back surface and a face that is oriented opposite to the back surface. The back surface is connected to the top surface of the battery by a panel. The receptacle moves in a fore-and-aft direction relative to the battery between a rearward position within the storage compartment and a forward position within the passenger compartment. The face of the receptacle engages the seat back, and the panel extends from the receptacle to the battery in the forward position for providing a raised platform extending to the passenger compartment.

In another embodiment, a storage system is provided with a container that is coupled to a battery within a vehicle storage compartment. A receptacle is also coupled to the battery. At least one of the receptacle and the container is pivotally connected to a top surface of the battery and movable in a fore-and-aft direction for providing a raised platform in a first configuration and for facilitating storage in a second configuration.

In yet another embodiment, a receptacle assembly is provided with a receptacle that is coupled to a battery within a vehicle storage compartment. A panel is provided with a proximal end that is pivotally connected to the receptacle and a distal end opposite the proximal end that is pivotally connected to a top surface of the battery. The receptacle is movable about the battery to a forward position upon a collapsed seat back to provide a raised platform.

In another embodiment, a vehicle is provided with a battery that is mounted to a vehicle body and extending behind a rear seat. A container is disposed rearward of the battery and includes a surface that is movable between a first position and a second position. The lower surface aligns with a top surface of the battery to provide a raised platform in the second position.

In yet another embodiment, a vehicle is provided with a battery that is mounted to a vehicle body and disposed within a storage compartment. The vehicle is also provided with a container having a surface and an open face. The container is adjustable between an upward position and a downward position. The open face exposes an inner portion of the container when the container is oriented in at least one of the upward position and the downward position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
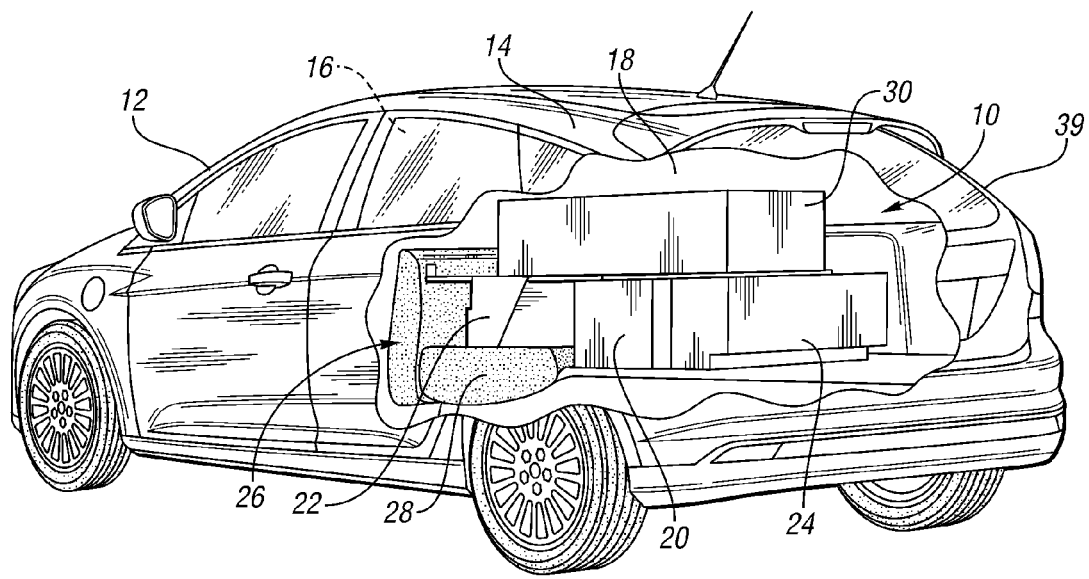
FIG. 1 is a partially fragmented view of a passenger vehicle with a storage system in accordance with at least one embodiment, and illustrated with a receptacle assembly oriented in a forward position and a container assembly oriented in a downward position.

With reference to FIG. 1, a storage system is illustrated in accordance with an embodiment and is generally referenced by numeral 10. The storage system 10 is located within a passenger vehicle 12. The passenger vehicle 12 includes a vehicle body 14 that defines a passenger compartment 16 and a storage compartment 18. The storage compartment 18 is oriented rearward of the passenger compartment 16 within the vehicle 12. A battery 20 is mounted to the vehicle body 14 within the storage compartment 18. The storage system 10 includes a receptacle assembly 22 and a container assembly 24 that are both coupled to the battery 20. The receptacle assembly 22 and the container assembly 24 are movable relative to the battery 20 for providing a raised platform in a first configuration and for storing articles in a second configuration.

A rear seating row 26 is oriented in the passenger compartment 16 and adjacent to the storage compartment 18. The rear seating row 26 includes a seat back 28 that is pivotally connected to the vehicle body 14 for providing access to the storage compartment 18 when the seat back 28 is in a collapsed position.

The vehicle 12 is an electric vehicle that is propelled by electric motors (not shown), according to one embodiment. In general, electric and hybrid-electric vehicles include larger batteries 20, or multiple batteries (not shown), when compared to conventional vehicles. Other embodiments of the system 10 are contemplated for hybrid-electric vehicles, including plug-in hybrid-electric vehicles, and conventional vehicles (not shown) that include a large power supply, such as battery 20, that is located within a vehicle storage compartment.

The battery 20 extends into the storage compartment 18 behind the rear seating row 26, which results in an uneven surface along the floor of the vehicle body 14. This uneven surface within the storage compartment 18 makes it difficult to store large objects, within the vehicle 12. However the storage system 10 adjusts to provide the raised platform that extends in the passenger compartment 16 to provide a generally level surface for accommodating large packages, such as package 30.

Figure 2:
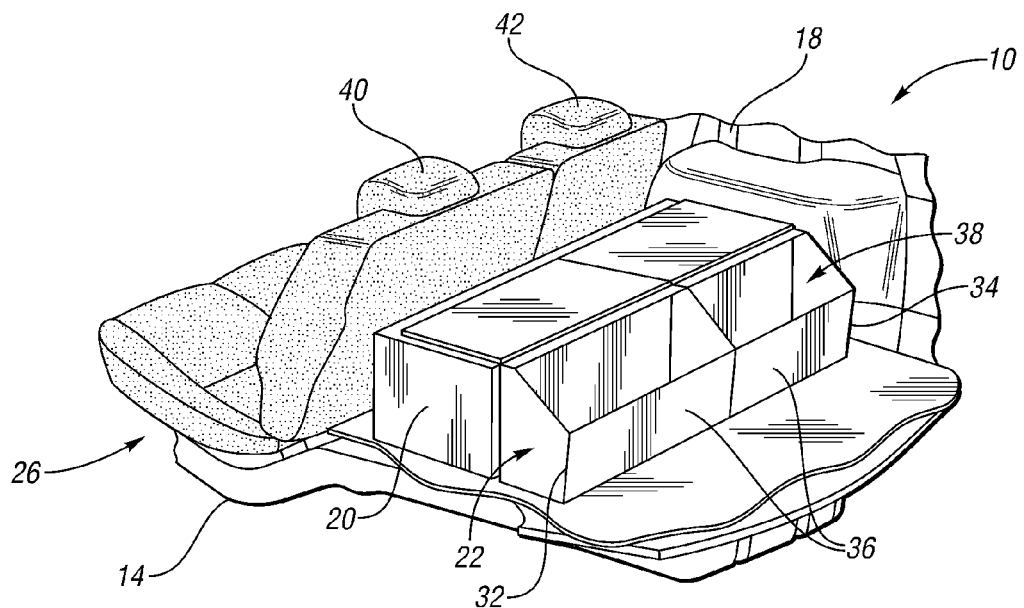
FIG. 2 is a rear perspective view of the storage system of FIG. 1, illustrated without the container assembly and with the receptacle assembly oriented in a rearward position.

Referring to FIGS. 1 and 2, the receptacle assembly 22 is movable in a fore-and-aft direction relative to the battery 20. The receptacle assembly 22 adjusts between a forward position within the passenger compartment 16 (FIG. 1), and a rearward position within the storage compartment 18 (FIG. 2). The receptacle assembly 22 is configured as a raised platform ("first configuration") in the forward position. The receptacle assembly 22 is configured for storage ("second configuration") in the rearward position.

The receptacle assembly 22 facilitates storage in the rearward position. The receptacle assembly 22 includes a first receptacle 32 and a second receptacle 34 that are oriented laterally adjacent to each other. Each receptacle 32, 34 defines an inner cavity for storing articles, such as tools, groceries, etc. (not shown). Each receptacle 32, 34 includes a face 36 with an opening 38 formed through the face 36 for providing access to the inner cavity when the receptacle 32, 34 is oriented in the rearward position. Other embodiments of the system 10 contemplate lids (not shown) disposed over the opening 38 of each receptacle 32, 34. The vehicle 12 includes a hatch 39 (shown in FIG. 1) that is pivotally connected to a rear surface of the vehicle body 14 for providing external access to the storage system 10, according to one embodiment.

Each receptacle 32, 34 adjusts independently of the other receptacle 32, 34. In the illustrated embodiment, the rear seating row 26 includes a double seat assembly 40 and a single seat assembly 42 oriented next to each other in a bench seat configuration. The double seat assembly 40 accommodates two occupants, and the single seat assembly 42 accommodates a single occupant. The first receptacle 32 is oriented rearward of the double seat assembly 40, and the second receptacle 34 is oriented rearward of the single seat assembly 42. The width of each receptacle 32, 34 corresponds to the width of the adjacent seat assembly 40, 42. This allows the first receptacle 32 to be oriented in a forward position, while the second receptacle 34 is oriented in a rearward position, and vice versa, for accommodating various packaging and occupancy configurations (not shown). Other embodiments of the system 10 contemplate a rear seating row 26 having two single seat assemblies 42 that are laterally spaced apart from each other (not shown). For such an embodiment, the receptacle assembly 22 may include two spaced apart receptacles (e.g., two second receptacles 34) that are each aligned with one of the seat assemblies 42 (not shown).

Figure 3:
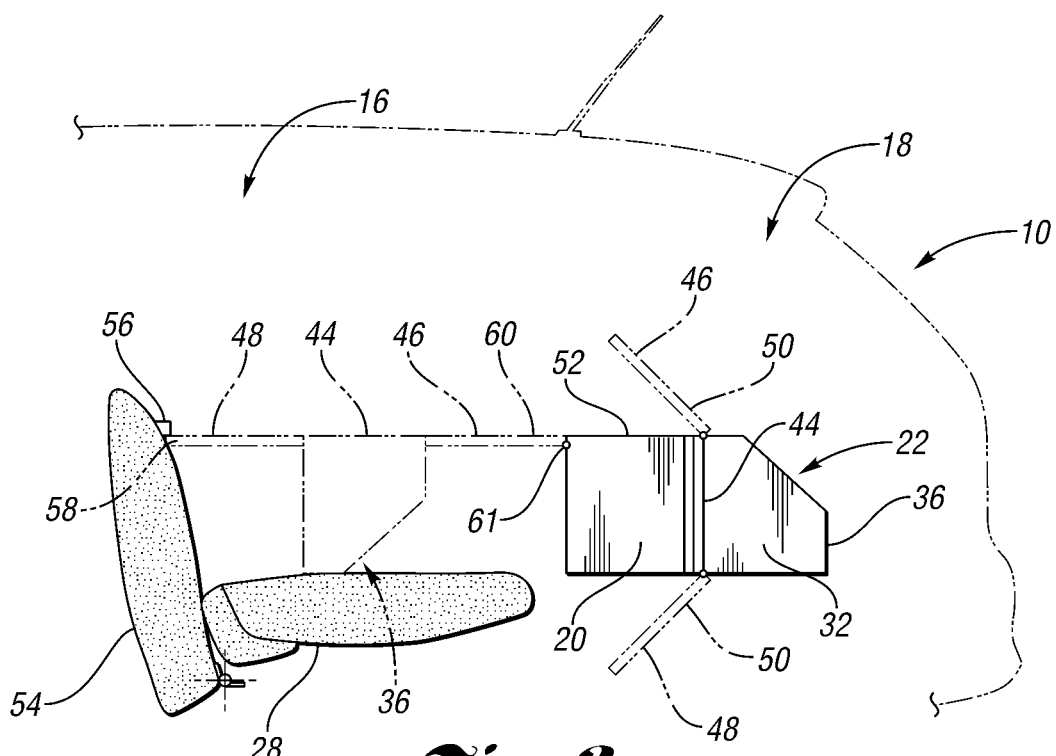
FIG. 3 is side schematic view of the receptacle assembly of FIG. 2.
Figure 4:
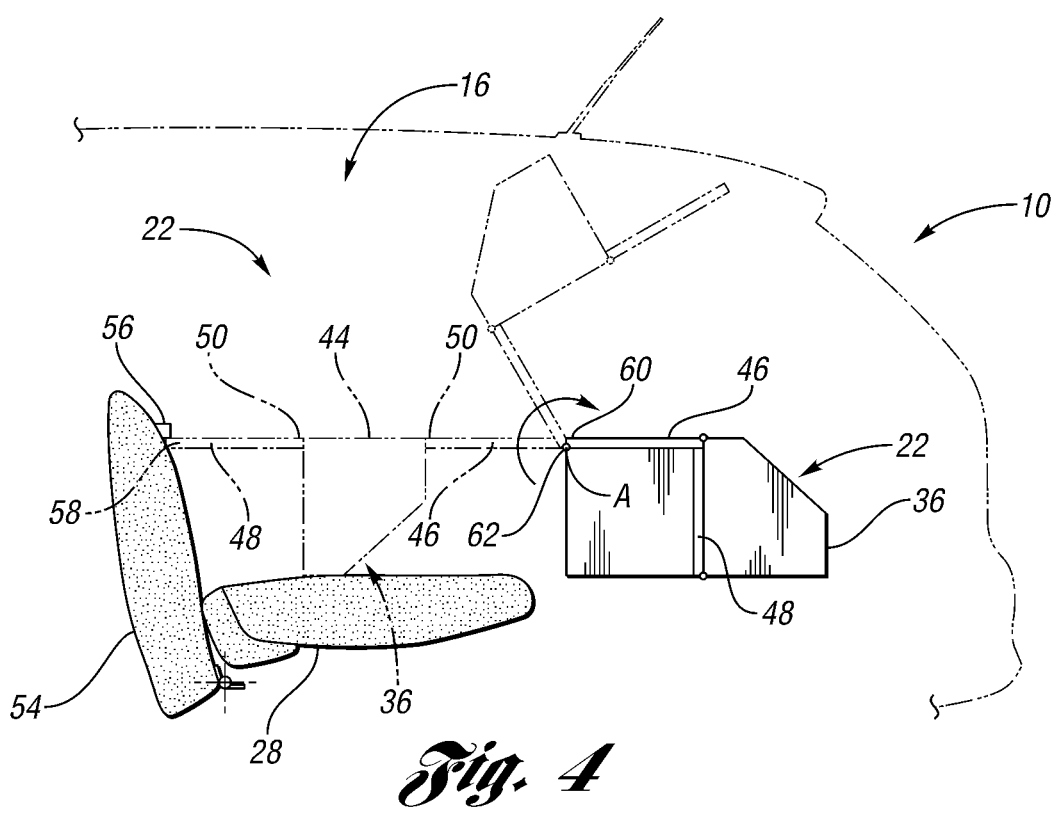
FIG. 4 is another side schematic view of the receptacle assembly of FIG. 2.

FIGS. 3 and 4 illustrate movement of the receptacle assembly 22 in a fore-and-aft direction relative to the battery 20 between the forward position and the rearward position. The receptacle assembly 22 is illustrated in phantom in the forward position.

The receptacle assembly 22 is configured as a raised platform in the forward position. Each receptacle 32, 34 includes a back surface 44 that is oriented opposite to the face 36. A first panel 46 and a second panel 48 are each pivotally connected to the back surface 44. Each panel 46, 48 includes a proximal end 50 that is pivotally connected to an edge of the back surface 44. The first panel 46 is connected to an upper edge of the back surface 44, and the second panel 48 is connected to a lower edge. The face 36 rests upon the seat back 28 and the panels 46, 48 extend away from the receptacle 32 in the forward position. The first panel 46 connects the receptacle 32 to a top surface 52 of the battery 20. Each seat assembly 40, 42 includes a seat cushion 54 that is pivotally connected to the vehicle body 14 for adjusting to an upright position. The second panel 48 extends from the receptacle 32 to the upright seat cushion 54. An attachment feature, such as a latch 56, is provided on the underside of the seat cushion 54, according to one embodiment. A distal end 58 of the second panel 48 engages the latch 56 for securing the second panel 48 to the seat cushion 54. The panels 46, 48, the back surface 44 and the top surface 52 of the battery 20 collectively provide the raised platform in the forward position.

FIG. 3 illustrates an embodiment of the receptacle assembly 22 that detaches from the battery 20 for adjustment between the forward and rearward positions. The first panel 46 folds over the second panel 48 and both panels 46, 48 are stowed between the receptacle 32 and the battery 20 in the rearward position. The storage system 10 may include attachment features (not shown) for securing the receptacle assembly 22 in the rearward position. To move the receptacle assembly 22 from the rearward position to the forward position, first the assembly 22 is removed from the storage compartment 18. Next, the receptacle assembly 22 is placed within the passenger compartment 16, such that the face 36 rests upon a collapsed seat back 28. Then, the panels 46, 48 are unfolded to extend away from each receptacle 32, 34. A distal end 60 of the first panel 46 is connected to the top surface 52 of the battery 20. The first panel 46 includes an attachment feature, such as a bracket 61 for connecting the distal end 60 to the top surface 52 of the battery 20.

FIG. 4 illustrates an embodiment of the receptacle assembly 22 that pivots about the battery 20 during adjustment between the forward and rearward positions. The first panel 46 extends over the top surface 52 of the battery 20 and the second panel 48 folds over the back surface 44 in the rearward position. A hinge 62 pivotally connects the distal end 60 of the first panel 46 to the top surface 52 of the battery 20. The hinge 62 allows the receptacle assembly 22 to pivot about a horizontal axis A-A between the rearward and forward positions. The face 36 of the receptacle 32, 34 rests upon the collapsed seat back 28 within the passenger compartment 16 in the forward position. The second panel 48 unfolds and extends away from the receptacle 32, 34 to engage the seat cushion 54.

Figure 5:
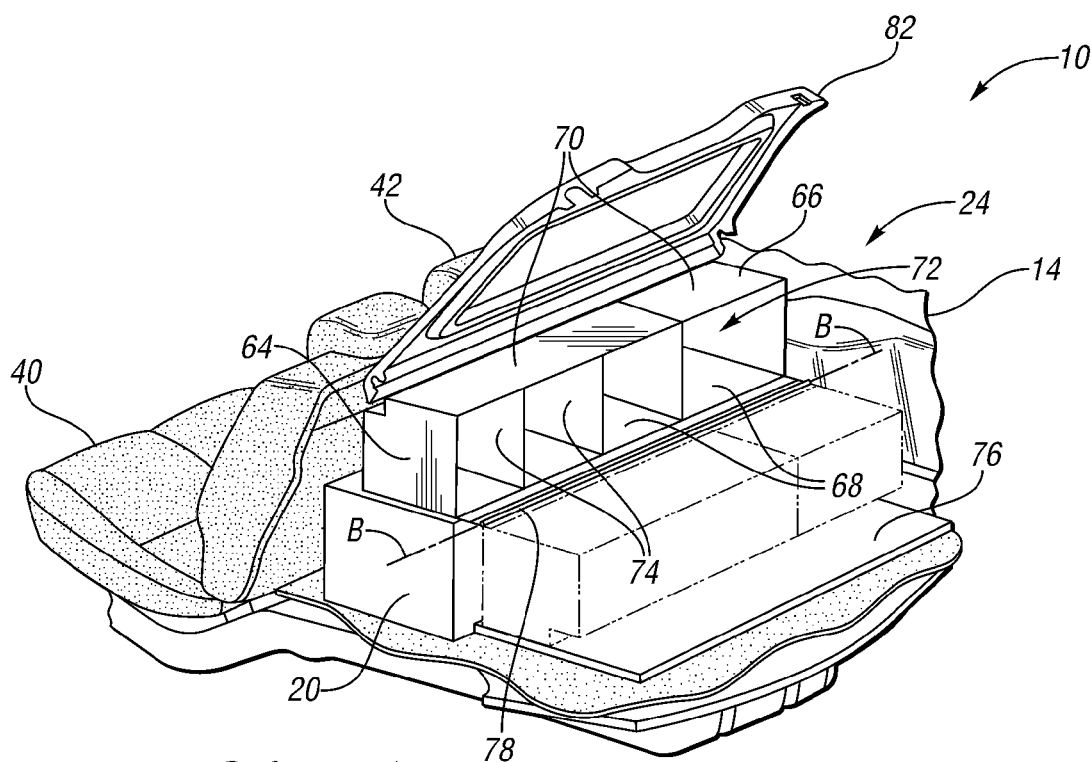
FIG. 5 is a rear perspective view of the storage system of FIG. 1, illustrated without the receptacle assembly and with the container assembly in an upward position and in the downward position in phantom.
Figure 6:
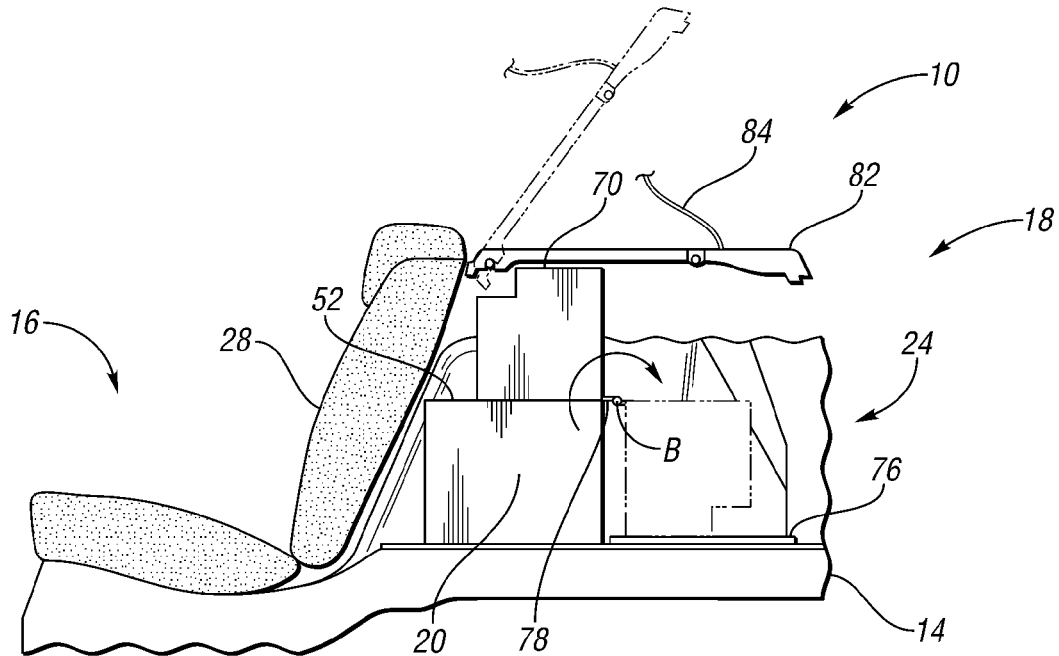
FIG. 6 is a side schematic view of the container assembly of FIG. 5.

Referring to FIGS. 5 and 6, the container assembly 24 is adjustable relative to the battery 20 between a downward position and an upward position. The container assembly 24 is configured as a raised platform ("first configuration"), and illustrated in phantom in the downward position. The container assembly 24 is configured for storage ("second configuration") in the upward position.

The container assembly 24 facilitates storage in the upward position. The container assembly 24 includes a first container 64 and a second container 66 that are laterally adjacent to each other. Each container 64, 66 has a generally rectangular shape that defines an inner cavity for storing articles, such as tools, groceries, etc. (not shown).

Each container 64, 66 includes a lower surface 68, an upper surface 70 and an open face 72 extending between the lower and upper surfaces 68, 70. The lower surface 68 rests upon the top surface 52 of the battery 20 in the upward position, and the open face 72 provides access to the inner cavities of the containers 64, 66. The first container 64 includes inner walls 74 that are laterally spaced apart from each other for separating the inner cavity into smaller storage compartments. The walls 74 also function as a structural member for supporting loads that are placed on the container assembly 24. Other embodiments of the system 10 include lids (not shown) that are disposed over the open face 72 for retaining articles within the containers 64, 66.

Each container 64, 66 adjusts independently of the other container 64, 66. The first container 64 is oriented rearward of the double seat assembly 40, and the second container 66 is oriented rearward of the single seat assembly 42. The width of each container 64, 66 corresponds to the width of the adjacent seat assembly 40, 42. This spacing allows the first container 64 to be oriented in the upward position, while the second container 66 is oriented in the downward position, and vice versa, for accommodating various packaging and occupancy configurations (not shown). Other embodiments of the system 10 contemplate a rear seating row 26 having two single seat assemblies 42 that are laterally spaced apart from each other (not shown). For such an embodiment, the container assembly 24 may include two spaced apart containers (e.g., two second containers 66) that are each aligned with one of the seat assemblies 42 (not shown).

The container assembly 24 extends the raised platform in the downward position. The upper surface 70 of the each container 64, 66 rests upon a portion of the vehicle body 14 in the downward position. In one embodiment a cover 76 is disposed over the vehicle body 14 within the storage compartment 18 to provide a flat surface for each container 64, 66 to rest upon. The lower surface 68 of the container 64, 66 is aligned with the top surface 52 of the battery 20 in the downward position for extending the raised platform further in the storage compartment 18.

FIGS. 5 and 6 illustrate adjustment of the container assembly 24 between the upward and downward positions. The lower surface 68 rests upon the top surface 52 of the battery 20 in the upward position. A hinge bracket 78 pivotally connects the lower surface 68 of each container 64, 66 to the top surface 52 of the battery 20. The hinge bracket 78 allows each container 64, 66 to pivot about a horizontal axis B-B between the upward and downward positions. The hinge bracket 78 may be configured as a detachable connection, to allow the container assembly 24 to be removed from the vehicle 12.

The vehicle 12 includes a package tray 82 that extends over the storage system 10, according to one embodiment. The package tray 82 separates the passenger compartment 16 from the storage compartment 18 when the seat backs 28 are in the upright position, as depicted in FIG. 6. The package tray 82 is pivotally connected to the vehicle body 14 about a forward end of the tray 82. One or more cables 84 extend from the hatch 39 and attach to a rearward end of the tray 82 for support. The cables 84 couple the tray 82 to the hatch 39 so that the tray 82 pivots upward as the hatch 39 is opened. The package tray 82 may be detached from the vehicle body 14 to create additional space for storage.

Figure 7:
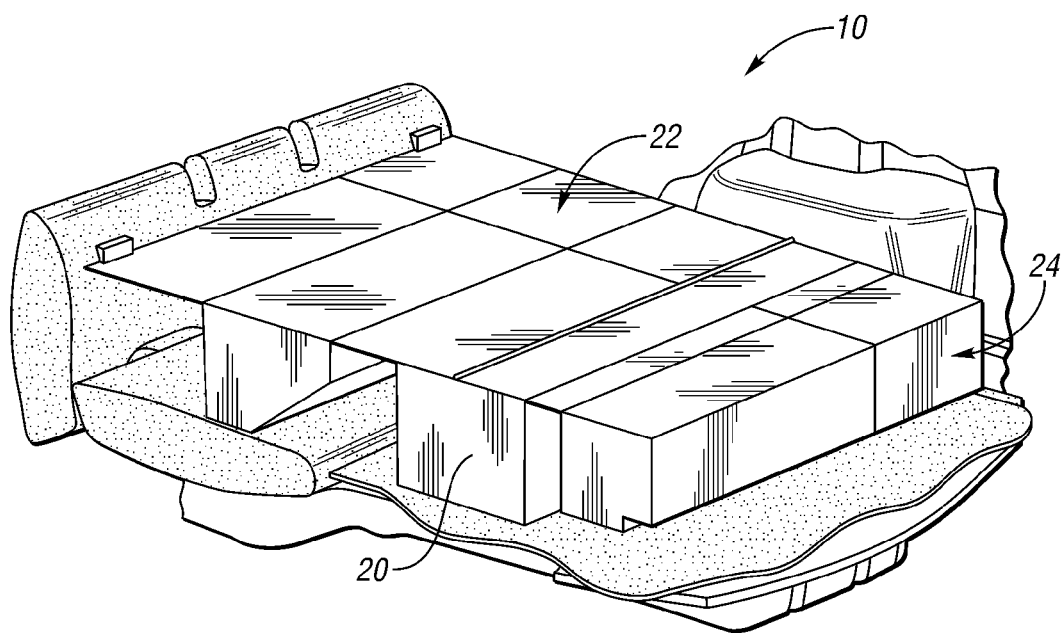
FIG. 7 is a rear perspective view of the storage system of FIG. 1.
Figure 8:
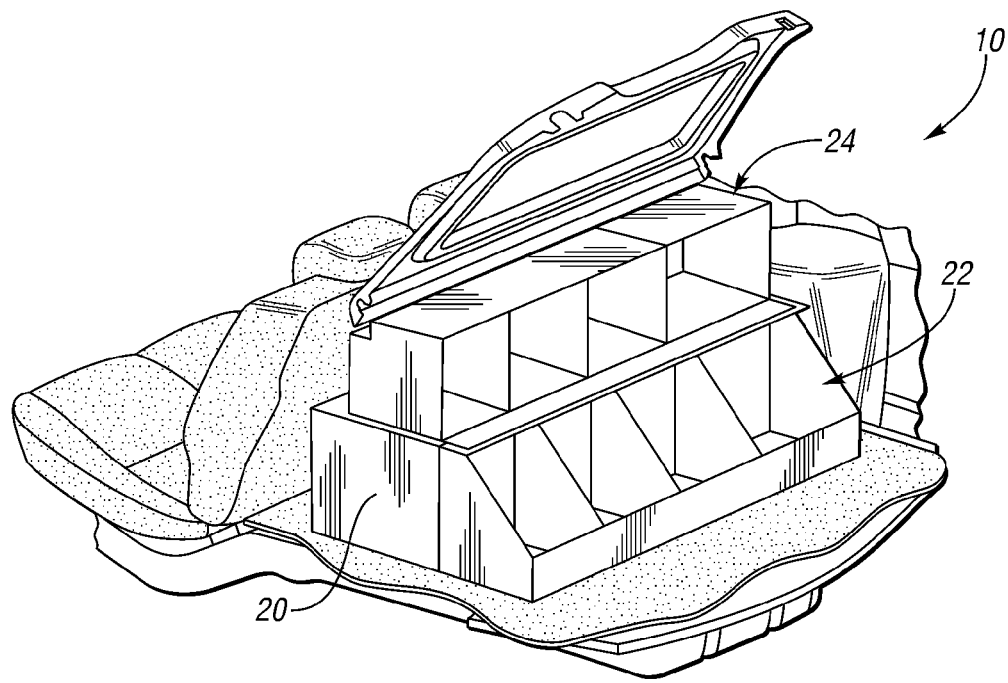
FIG. 8 is another rear perspective view of the storage system of FIG. 1, illustrated with the receptacle assembly oriented in the rearward position and the container assembly oriented in the upward position.

With reference to FIGS. 1-8, the receptacle assembly 22 and the container assembly 24 are movable in a fore-and-aft direction relative to the battery 20 for providing a raised platform in a first configuration (as shown in FIG. 7) and for storing articles in a second configuration (as shown in FIG. 8). As described above with respect to FIGS. 3-6, both the receptacle assembly 22 and the container assembly 24 may be pivotally connected to the battery 20 or detachably connected to the battery 20. However, at least one of the receptacle assembly 22 and the container assembly 24 is detachably connected to the battery 20 to allow movement of both assemblies 22, 24.

In one embodiment, the storage system 10 includes a receptacle assembly 22 that is pivotally connected to the battery 20 (as shown in FIG. 4), and a container assembly 24 that is detachable from the battery 20. To adjust the system 10 from the second configuration (FIG. 8) to the first configuration (FIG. 7); first the container assembly 24 is detached from the battery 20 and removed from the storage compartment 18. Next, the receptacle assembly 22 pivots about axis A-A from the rearward position to the forward position, as shown in FIG. 4. Then, the container assembly 24 is reattached to the battery 20 in the downward position to extend the raised platform as shown in FIG. 7.

In another embodiment of the storage system 10, the container assembly 24 is pivotally connected to the battery 20 (as shown in FIG. 6), and the receptacle assembly 22 is detachable from the battery 20 (as shown in FIG. 3). To adjust the system 10 from the second configuration (FIG. 8) to the first configuration (FIG. 7); first the receptacle assembly 22 is detached from the battery 20 and removed from the storage compartment 18, as shown in FIG. 3. Next, the container assembly 24 pivots about axis B-B from the upward position to the downward position, as shown in FIG. 6. The receptacle assembly 22 is then reattached to the battery 20 in the forward position to provide the raised platform as shown in FIG. 7.

Other embodiments of storage system 10 include a receptacle assembly 22 and a container assembly 24 that are both detachable from the battery 20. Alternatively, the storage system 10 may include only one of the receptacle assembly 22 and the container assembly 24.

While embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A passenger vehicle comprising:
a vehicle body having a passenger compartment and a storage compartment oriented rearward of the passenger compartment;
a seating row oriented in the passenger compartment forward of the storage compartment, the seating row having a seat back pivotally connected to the vehicle body for providing access to the storage compartment when the seat back is in a collapsed position;

a battery mounted to the vehicle body and disposed within the storage compartment, the battery having a top surface; and a receptacle having a back surface and a face oriented opposite to the back surface, the back surface being connected to the top surface of the battery by a panel, the receptacle being moveable in a fore-and-aft direction relative to the battery between a rearward position within the storage compartment and a forward position within the passenger compartment;

wherein the face of the receptacle engages the seat back and the panel extends from the receptacle to the battery in the forward position for providing a raised platform extending in the passenger compartment.

2. The passenger vehicle of claim 1 wherein the receptacle comprises an opening formed through the face for exposing an inner portion of the receptacle when the receptacle is in the rearward position.

3. The passenger vehicle of claim 1 further comprising a hinge for pivotally connecting the panel to the top surface of the battery.

4. The passenger vehicle of claim 1 further comprising a container with a lower surface and an open face extending from the lower surface, the lower surface being connectable to the top surface of the battery and the container being movable relative to the battery between an upward position and a downward position;

wherein the lower surface of the container rests upon the top surface of the battery and the open face provides access to an inner portion of the container for storage in the upward position of the container.

5. The passenger vehicle of claim 4 wherein the lower surface of the container is aligned with the top surface of the battery in the downward position of the container for extending the raised platform in the storage compartment.

6. A vehicle comprising:
a battery mounted to a vehicle body and disposed within a storage compartment and extending behind a rear seat; and
a container disposed rearward of the battery and having a surface movable between a first position and a second position;
wherein the surface aligns with a top surface of the battery to provide a raised platform in the second position.

7. The vehicle of claim 6 wherein the container further comprises a face with an opening formed through the face for exposing an inner portion of the container when the container is oriented in at least one of the first position and the second position.

8. The vehicle of claim 6 further comprising a second container oriented laterally adjacent to the container, the second container being independently adjustable relative to the container about the battery between the first position and the second position.

9. The vehicle of claim 6 further comprising a receptacle having a back surface and a face oriented opposite to the back surface, the back surface being connected to a top surface of the battery by a panel, the receptacle being moveable in a fore-and-aft direction relative to the battery between a rearward position within a storage compartment and a forward position within a passenger compartment.

10. The vehicle of claim 9 further comprising a seating row oriented in the passenger compartment and forward of the storage compartment, the seating row having a seat back pivotally connected to the vehicle body for providing access to the storage compartment when the seat back is in a collapsed position;

wherein the face of the receptacle engages the seat back and the panel extends from the receptacle to the battery in the forward position for extending the raised platform into the passenger compartment.

11. The vehicle of claim 9 further comprising a hinge for pivotally connecting the panel to the top surface of the battery, wherein the panel and the top surface of the battery together with the back surface of the receptacle and the surface of the container provide the raised platform.

12. The vehicle of claim 9 further comprising a second panel pivotally connected to the back surface of the receptacle, wherein the second panel extends from the back surface in the first position to engage a seat cushion and extend the raised platform in a vehicle passenger compartment.

13. A vehicle comprising:
a battery mounted to a vehicle body and disposed within a storage compartment; and
a container disposed adjacent to the battery and having a surface and an open face, the surface being adjustable between an upward position and a downward position, wherein the surface is aligned with a top surface of the battery in at least one of the upward position and the downward position to provide a raised platform, the open face exposing an inner portion of the container when the container is oriented in at least one of the upward position and the downward position.

14. The vehicle of claim 13 wherein the container is disposed rearward of the battery in at least one of the upward position and the downward position.

15. The vehicle of claim 13 further comprising a second container oriented laterally adjacent to the container within the storage compartment, the second container being independently adjustable relative to the container about the battery between the upward position and the downward position.

16. The vehicle of claim 13 further comprising:
a second receptacle oriented laterally adjacent to the receptacle; and
a second panel having a first end pivotally connected to the second receptacle and a second end opposite the first end pivotally connected to a top surface of the battery;
wherein the second receptacle is pivotally adjustable about the battery to a forward position upon a second collapsed seat back to provide a second raised platform.

17. The vehicle of claim 13 further comprising a receptacle having a back surface and a face oriented opposite to the back surface, the back surface being connected to a top surface of the battery by a panel, the receptacle being moveable in a fore-and-aft direction relative to the battery between a rearward position within the storage compartment and a forward position within a passenger compartment.

18. The vehicle of claim 17 further comprising a seating row oriented in the passenger compartment and forward of the storage compartment, the seating row having a seat back pivotally connected to the vehicle body for providing access to the storage compartment when the seat back is in a collapsed position;

wherein the face of the receptacle engages the seat back and the panel extends from the receptacle to the battery in the forward position to provide a raised platform within the passenger compartment.

* * * * *